(12) United States Patent
     Potter (10) Patent No.: US 9,572,440 B2
(45) Date of Patent: Feb. 21, 2017

(54) OPTICAL ILLUSION DISPENSERS

(71) Applicant: Anthony B Potter, Crozet, VA (US)

(72) Inventor: Anthony B Potter, Crozet, VA (US)

( * ) Notice: Subject to any disclaimer, the term of this patent is extended or adjusted under 35 U.S.C. 154(b) by 39 days.

(21) Appl. No.: 14/696,405

(22) Filed: Apr. 25, 2015

(65) Prior Publication Data

US 2016/0309933 A1    Oct. 27, 2016

(51) Int. Cl.
    *A47G 19/00*    (2006.01)
    *A47G 19/24*    (2006.01)
    *A47J 42/50*    (2006.01)
    *B65D 25/52*    (2006.01)
    *B65D 83/06*    (2006.01)

(52) U.S. Cl.
    CPC ............... *A47G 19/24* (2013.01); *A47J 42/50* (2013.01); *B65D 25/52* (2013.01); *B65D 83/06* (2013.01)

(58) Field of Classification Search
    CPC .... A47G 19/24; A47G 19/00; B65D 81/3288; B65D 83/06

USPC ............ 220/23.83, 575; D9/743; 215/10, 3; 222/143
    See application file for complete search history.

(56) References Cited

U.S. PATENT DOCUMENTS

| | | | | |
|---|---|---|---|---|
| 1,598,409 | A * | 8/1926 | Alaj | A47G 19/00 206/502 |
| 5,325,978 | A * | 7/1994 | Rabig | B42F 7/145 206/424 |
| 5,732,847 | A * | 3/1998 | Caldi | A47G 19/08 206/546 |
| 7,168,589 | B2 * | 1/2007 | Dark | A47G 19/2272 220/711 |
| 7,665,634 | B2 * | 2/2010 | Pressler | A47K 5/1202 215/390 |
| 7,971,075 | B2 * | 6/2011 | Diab | H04L 12/10 307/17 |
| 2007/0272092 | A1 * | 11/2007 | Ehrenreich | F25D 25/005 99/646 C |
| 2014/0042116 | A1 * | 2/2014 | Shen | B65D 21/0204 215/6 |

* cited by examiner

*Primary Examiner* — Shawn M Braden (57) ABSTRACT

A pair of dispensing devices is provided that exhibits an optical illusion that two identically sized such dispensing devices appear to be different sizes.

18 Claims, 6 Drawing Sheets

OPTICAL ILLUSION DISPENSERS

CROSS-REFERENCE TO RELATED APPLICATIONS

None

FIELD OF THE INVENTION

The present invention relates to dispensers that provide the optical illusion of two identically sized devices appearing to be of different sizes.

BACKGROUND OF THE INVENTION

Today's marketplace for dispensing devices for the home or office is thriving and crowded. It is difficult for merchants and manufacturers in this market to distinguish their products from the vast array of choices available to the consumer. Adding the novelty of a striking optical illusion to the design of everyday dispensing devices adds a new aesthetic and amusement value to them. Especially common in the average household are dispensers for salt and pepper, other spices, oils and vinegars, bath powders and bath salts and the like. In addition, many disposable dispensers used by manufacturers to package consumables find their ways into the average household. Adding an optical illusion to such household dispensers adds a welcome new dimension of enjoyment for the consumer, and adding such an optical illusion to the packaging of common consumables can give a marketing edge by attracting attention to their novel design.

U.S. Pat. No. 8,051,592 B2 (Gary W. Schnuckle) enhances drinking cups and dispensers for liquids by adding a 3D tableau optical illusion effect visible when peering into the mouth of a cup or when looking through the transparent sides of a dispenser. U.S. Pat. No. 6,065,623 (Valentin Hierzer and Steve Sungsuk Kim) discloses closures for dispensing packages that use a lenticular lens to provide the illusion of three dimensional, moving, or multiple images to enhance the saleability and marketability of products contained therein.

One striking and very well known optical illusion, discovered by the American psychologist Joseph Jastrow in the nineteenth century, involves displaying two identical two dimensional arch-shaped figures. When one such two dimensional figure is aligned adjacent to another so that one of the arches is nestled next to the other, the strong illusion effect occurs that one figure is significantly larger than the other. Nothing in the prior art or on the market today utilizes this striking illusion to enhance the marketability of dispensers or products packaged in disposable dispensers such as foodstuffs, confectionaries, cosmetics, cleaning agents, or office products, etc., or to enhance the amusement, novelty and aesthetic value to consumers of such dispensers or such products packaged in disposable dispensers.

SUMMARY OF THE INVENTION

The present invention provides a novel dispenser for dispensing substances or items (e.g., spices, liquids, powders, cereals, confectionaries), wherein two identically sized such dispensing devices present the optical illusion of being different sizes.

The present invention also provides a novel method of providing a novel dispenser for dispensing substances or items (e.g., spices, liquids, powders, cereals, confectionaries), wherein two identically sized such dispensing devices present the optical illusion of being different sizes.

These and other aspects of the present invention have been accomplished in view of the discovery of a dispenser as described herein.

DETAILED DESCRIPTION OF THE INVENTION

Incorporating the Jastrow optical illusion into the design of a dispenser adds novelty, amusement, and aesthetic value to a practical means for dispensing substances or items. Such dispensers can include, but are not limited to, retail product dispensers, jars for cookies or confectionaries, dispensers of foods or food preparation ingredients in the kitchen, dispensers for office supplies such as staples, pens, or notepads, or dispensers for hardware items in a workshop. The means of dispensing for such dispensers include, but are not limited to, shakers for powders or spices, grinders for spices and salts, cruets for oil and vinegar, hand pumps for liquid soaps and lotions, carafes for wines or spirits, slotted openings for tissues or wipes, or large open mouths on storage bins for cotton balls, tooth picks, or confectionaries.

In an aspect of the invention, a method is provided for designing a set of optical illusion dispensers which exhibit an optical illusion that one of the dispensers is larger than the other when, in fact, they are identical in size.

In another aspect of the invention, a pair of dispensers is provided, comprising:

A pair of dispensers comprising:
a. a first dispenser comprising:
   i. a container having an arc-like shape, and having a front face, a back face, a top face, a bottom face, a left face, a right face, and at least one cavity;
      1. the front face of said container being a substantially planar arc-shaped surface having a top edge, an opposing bottom edge, a left edge and an opposing right edge;
         a. the top edge of said front face being a concave circular arc of constant radius of curvature;
         b. the opposing bottom edge of said front face being a convex circular arc of constant radius of curvature equal to the radius of curvature of the top edge thereof, being approximately concentric with the top edge thereof, and being substantially longer than the top edge thereof;
         c. the left edge of said front face being a straight line which intersects a tangent to the arc of the top edge thereof, said tangent being determined at the left end point of the top edge of said front face, at an angle greater than 100,° and which intersects a tangent to arc of the bottom edge thereof, said tangent being determined at the left end point of the bottom edge of said front face, at an angle less than 86°; and,
         d. the opposing right edge of said front face being a straight line which intersects a tangent to the arc of the top edge thereof, said tangent being determined at the right end point of the top edge of said front face, at an angle greater than 85,° and intersects a tangent to the arc of the bottom edge thereof, said tangent being determined at the right end point of the bottom edge of said front face, at an angle less than 101°;
      2. the back face of said container being a substantially planar arc-shaped surface having a top edge, an opposing bottom edge, a left edge and an opposing right edge;
         a. the back face of said container being a mirror image of, and substantially parallel to, the front face thereof;
         b. the left edge of the back face of said container being substantially parallel to the opposing right edge of the front face thereof; and,
         c. the opposing right edge of the back face of said container being substantially parallel to the left edge of the front face thereof;
      3. the top face of said container being a cylindrically curved concave surface of constant radius of curvature equal to the radius of curvature of the top edge of the front face thereof, and extending substantially perpendicularly between the top edge of the front face thereof and the top edge of the back face thereof;
      4. the bottom face of said container being a cylindrically curved convex surface of the same constant radius of curvature as the bottom edge of the front face thereof, and extending substantially perpendicularly between the bottom edge of the front face thereof and the bottom edge of the back face thereof;
      5. the left face of said container being a substantially planar surface, being substantially rectangular in shape, and extending substantially perpendicularly between the left edge of the front face thereof and the opposing right edge of the back face thereof;
      6. the right face of said container being a substantially planar surface, being substantially rectangular in shape, and extending substantially perpendicularly between the opposing right edge of the front face thereof and the left edge of the back face thereof; and,
      7. the at least one cavity of said container opening onto at least one face thereof, and being of sufficient size and shape to receive and store a predetermined substance or substances or items;
   ii. a means for dispensing the substance or substances or items contained within the at least one cavity of said container; and,
   iii. optionally, a means for sealing the substance or substances or items stored within the at least one cavity of said container; and,
b. a second dispenser comprising:
   i. a container having an arc-like shape, and having a front face, a back face, a top face, a bottom face, a left face, a right face, and at least one cavity;
      1. said container being congruent with the container of the first dispenser; and,
      2. the at least one cavity of said container opening onto at least one face thereof, and being of sufficient size and shape to receive and store a predetermined substance or substances or items;
   ii. a means for dispensing the substance or substances or items stored within the at least one cavity of said container; and,
   iii. optionally, a means for sealing the substance or substances or items stored within the at least one cavity of said container.

Dispensers of my invention can be opaque, translucent, or transparent, and can be manufactured using numerous materials including, but not limited to, wood, plastic, metal, glass, natural fibers and fabrics.

Whatever their materials of manufacture or their means of dispensing, illusion dispensers of my invention are best employed in sets of two or more dispensers identical in size but bearing different ornamentation, such as contrasting colors or differing labels. The strength of the illusion is best demonstrated by reversing the relative positions of a pair of dispensers of my invention, the two dispensers being easily distinguished by differing ornamentation. Thus, when switching the positions of the two dispensers, the identity of the apparently larger dispenser changes abruptly and dramatically. For example, if one dispenser were white and the other black, and the black dispenser laid to rest on it's convex surface and the white dispenser stacked on top of the black dispenser, the white dispenser would appear to be the larger of the two. Upon switching the position of the two dispensers, the black dispenser suddenly, and surprisingly, appears to be larger than the white dispenser. The optical illusion effect can be so strong that the two dispensers seem to have somehow magically changed in size.

Ideal for such demonstrations are sets of dispensers for groups of differing substances or items that are frequently used together such as salt and pepper, oil and vinegar, red wine and white wine, body powder and foot powder, etc. Additionally, the entertainment value of the Jastrow illusion is enhanced in social settings suitable for presentation of the effect to one or more observers uninitiated to the illusion.

Such venues might include a gathering at a dinner table, at a formal meeting, at product demonstrations at conventions, or in a retail environment.

Figure 1:
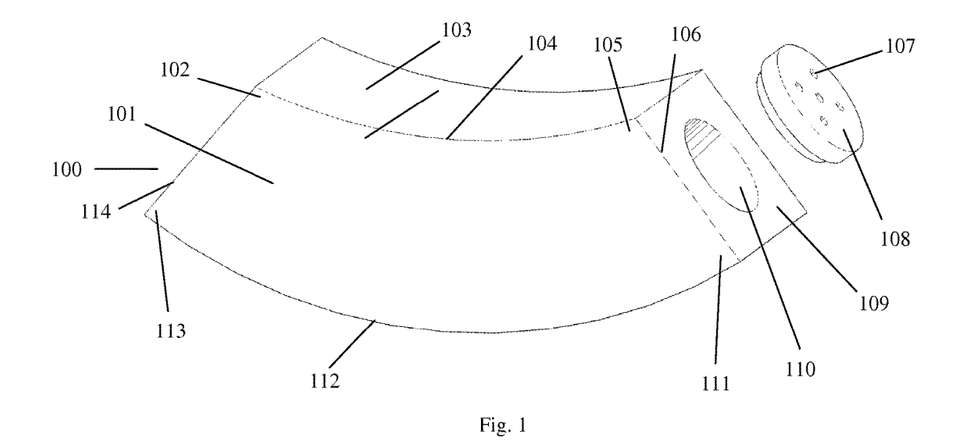
FIG. 1 is a top, front, right side perspective view of a single dispenser of a pair of dispensers of a first embodiment of my invention in the exemplary context of a pair of dispensers for bath salt and body powder.
Figure 2:
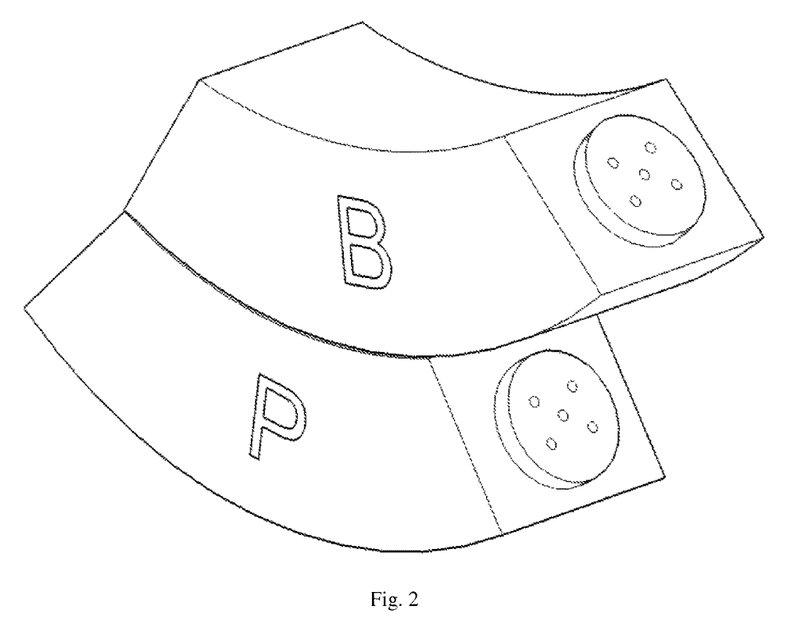
FIG. 2 is a top, front, right side perspective view of a pair of dispensers of the first embodiment of my invention stacked one upon the other.
Figure 3:
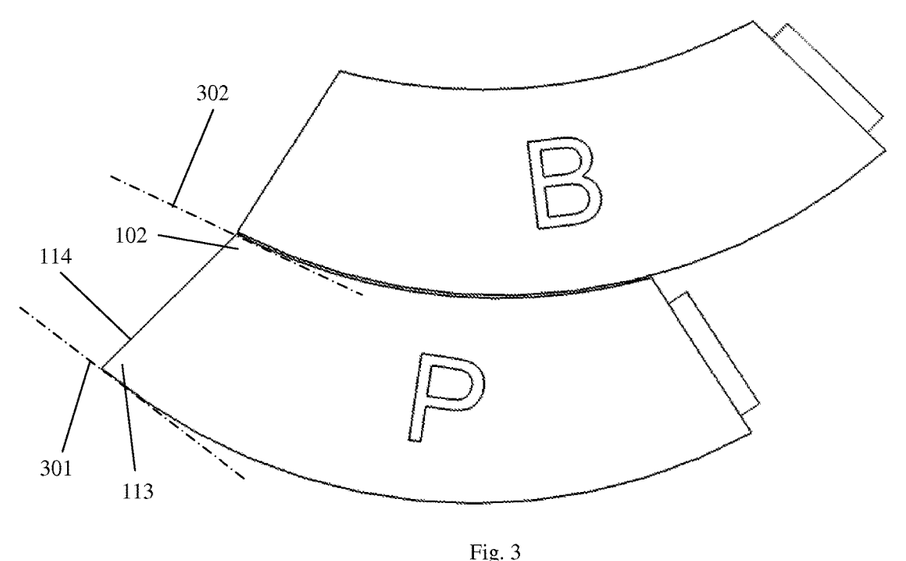
FIG. 3 is a front elevational view of a pair of dispensers of the first embodiment of my invention stacked one upon the other.

Certain aspects of the present invention are depicted in FIGS. 1-3. These figures illustrate an embodiment of my invention in the exemplary context of a pair of shaker type dispensers for bath salts or body powder. Container 100 has a cavity 110 which contains body powder or bath salts. Removable cap 108 has several apertures 107 that permit the dispensing of the powder or salts by shaking the container. These apertures may remain permanently open, or, optionally, they may be designed to close by twisting the cap or any other means, thereby sealing the contents inside the container. The cap attaches to the dispenser by either snapping or screwing into the container 100, or any other suitable means. The front face 101 of the container is arc-like in shape, the top edge 104 of the face being a convex arc of constant radius of curvature and the bottom edge 112 being a convex arc of the same constant radius of curvature as the top edge. A typical radius of curvature for hand held dispensers is 6 inches. The left edge 114 and right edge 106 of the front face are straight lines. These edges intersect the bottom edge 112 at corners 111 and 113 at an acute angle less than 86° to two tangents to the arc of the bottom edge, said tangents being determined at the two end points of the bottom edge, and one of said tangents being illustrated as 301 in FIG. 3. They intersect the top edge 104 at corners 102 and 105 at an obtuse angle more than 100° to two tangents to the arc of the top edge, said tangents being determined at the two end points of the top edge, and one of said tangents being illustrated as 302 in FIG. 3. The right face 109 of the container is a planar surface, substantially perpendicular to the front face 101. In this embodiment of my invention, the left face, not seen in FIG. 1, is a mirror image of the right face but lacking a cavity similar to the cavity 110 on the right face.

The top face 103 of the container is a cylindrical surface of the same constant radius of curvature as the top edge 104 and the bottom edge 112 of the front face. The bottom face of the container, not seen in FIG. 1, is also a cylindrical surface of the same constant radius of curvature as the top face. Thus two dispensers of my invention can be stacked one on top of the other with the bottom face of the upper dispenser contiguous with the top face of the lower dispenser. FIG. 2 illustrates a perspective view of two such dispensers stacked one on top of the other and FIG. 3 illustrates the front elevational view of the same. FIG. 3 illustrates the illusion created by such a placement of dispensers, namely, the optical illusion that the top dispenser is substantially larger than the bottom dispenser.

Figure 4:
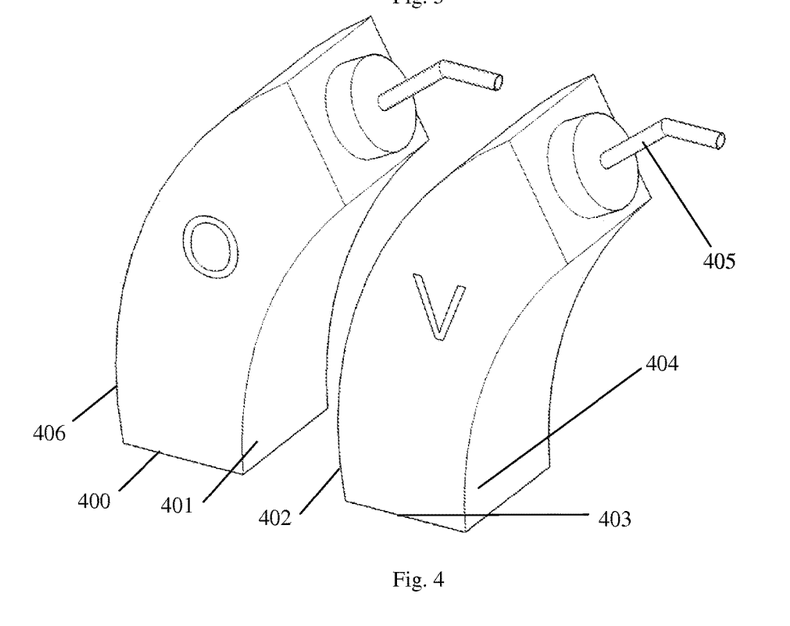
FIG. 4 is a top, front, right side perspective view of a pair of dispensers of a second embodiment of my invention in the exemplary context of a pair of cruets for oil and vinegar so shaped that they can stand on end upright.
Figure 5:
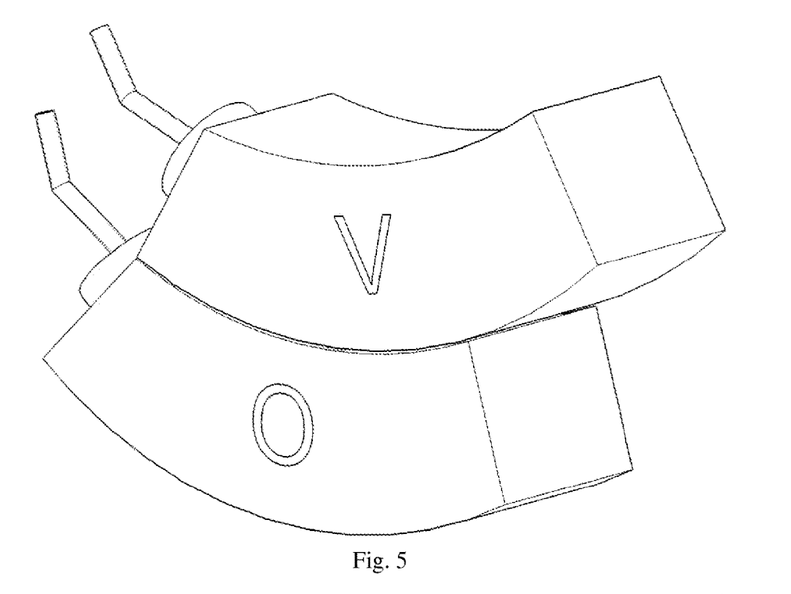
FIG. 5 is a top, front, right side perspective view of a pair of dispensers of the second embodiment of my invention stacked one upon the other.
Figure 6:
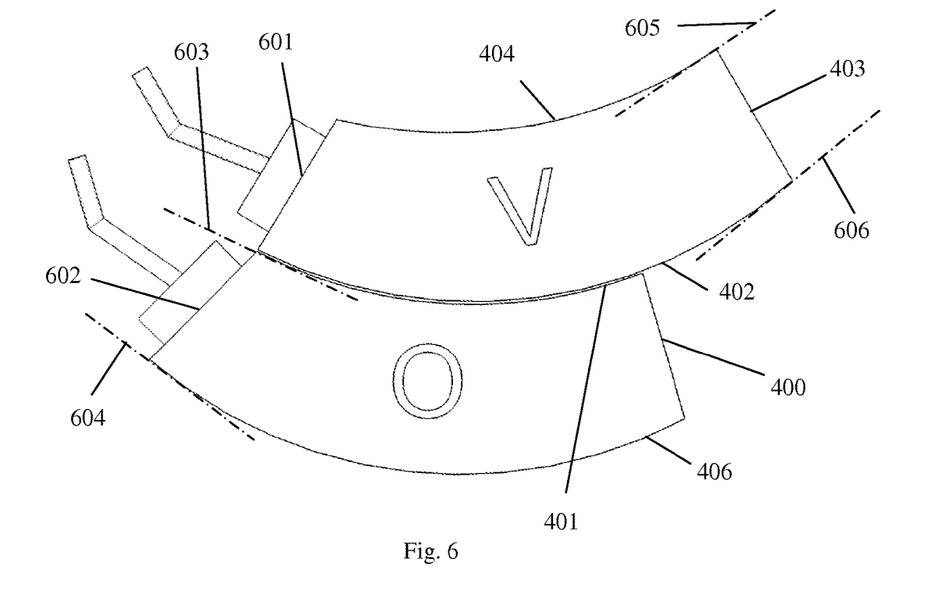
FIG. 6 is a front elevational view of a pair of dispensers of the second embodiment of my invention stacked one upon the other.

FIG. 4 illustrates a second embodiment of my new invention in the exemplary context of a pair of cruets for oil and vinegar. In this embodiment, the means of dispensing the liquid held in each container is a tube 405 which permits dripping the liquid by tipping and shaking the dispenser. In this embodiment the container tubes extend from caps which seal the cavities inside the containers, and which can be removed to allow filling the containers. Also in this embodiment, the flat surfaces 400 and 403, the cruet bottom surfaces in FIG. 4, are substantially perpendicular to the tangents to the curved surfaces 401, 402, 404 and 406, the sides in FIG. 4, thereby permitting the dispensers to balance on these bottom surfaces. FIG. 5 illustrates in a perspective view of two of these cruets on their sides, stacked one on top of the other. FIG. 6 illustrates a front elevational view of the two stacked cruets. This view more clearly illustrates the near perpendicularity of flat surfaces 400 and 403, the sides in the position of FIG. 6, to the curved surfaces 401, 402, 404 and 406. Note that the intersection of flat surface 403 with the tangent 605 to the concave surface 404 is greater than 85° and that the intersection of flat surface 403 with the tangent 606 to the convex surface 402 is less than 101°. Note also that the angle of intersection of the flat surface 602, the side in the position of FIG. 6, and the tangent 603 to the concave curved surface 401 is still more than 100°, as is the angle of intersection of the flat surface 601 with the tangent to the concave curved surface 404. Note too that the angle of intersection of the flat surface 601 and the tangent 604 to the convex curved surface 402 is also still less than 86°, as is the angle of intersection of the flat surface 602 and the tangent 603 to the convex curved surface 406. To some observers the change in angle of the flat surfaces 400 and 403 diminishes the illusion effect that the top cruet is larger than the bottom cruet.

All embodiments of my invention have at least one pair of substantially planar side faces on the ends of a pair of dispensers, corresponding to surfaces 601 and 602 in FIG. 6, with corresponding obtuse and acute angles of intersection with the tangents to the top and bottom curved surfaces. These pairs of faces are aligned to be approximately coplanar when demonstrating the illusion, and they are necessary to create the illusion effect. The other side faces, corresponding to surfaces 400 and 403 in FIG. 6, may, optionally, have the same angles of intersection with the planes tangent to the top and bottom surfaces, but they may also be closer to perpendicular to the planes tangent to permit standing the dispensers on end without eliminating the illusion effect.

Figure 7:
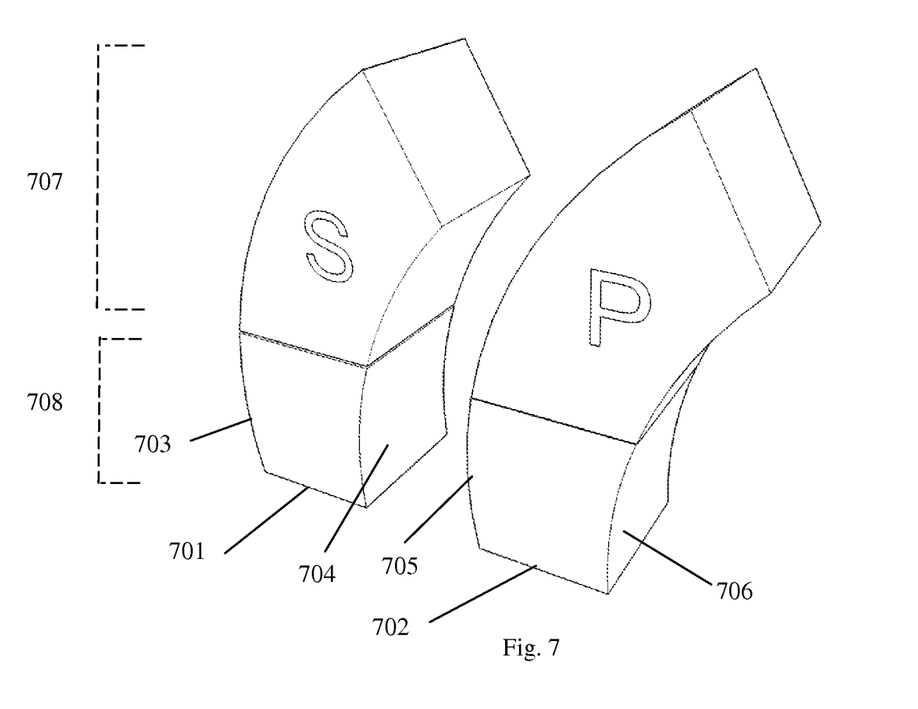
FIG. 7 is a top, front, right side perspective view of a pair of dispensers of a third embodiment of my invention in the exemplary context of a pair of salt and pepper grinders so shaped that they can stand on end and bisected horizontally to permit operation of the grinding mechanism.
Figure 8:
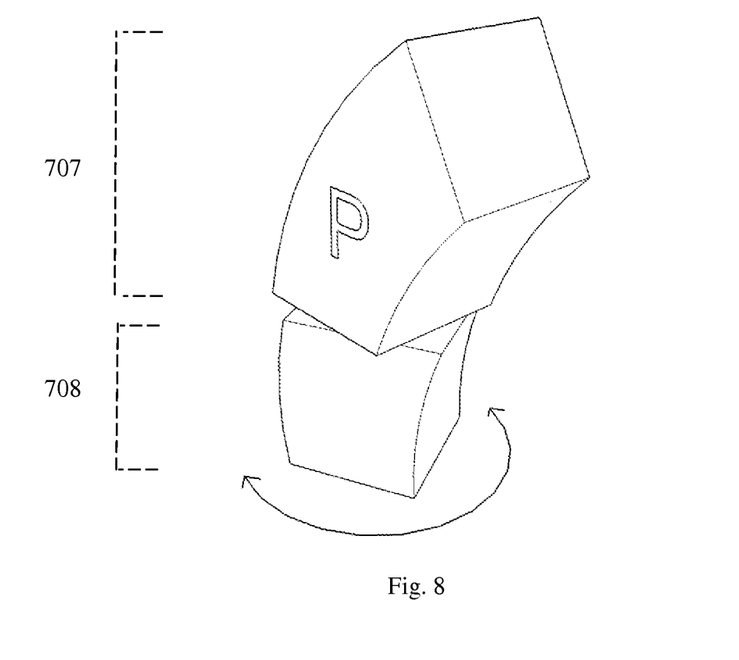
FIG. 8 is a top, front, right side perspective view of a single dispenser of the third embodiment of my invention while being twisted to operate the grinding mechanism.
Figure 9:
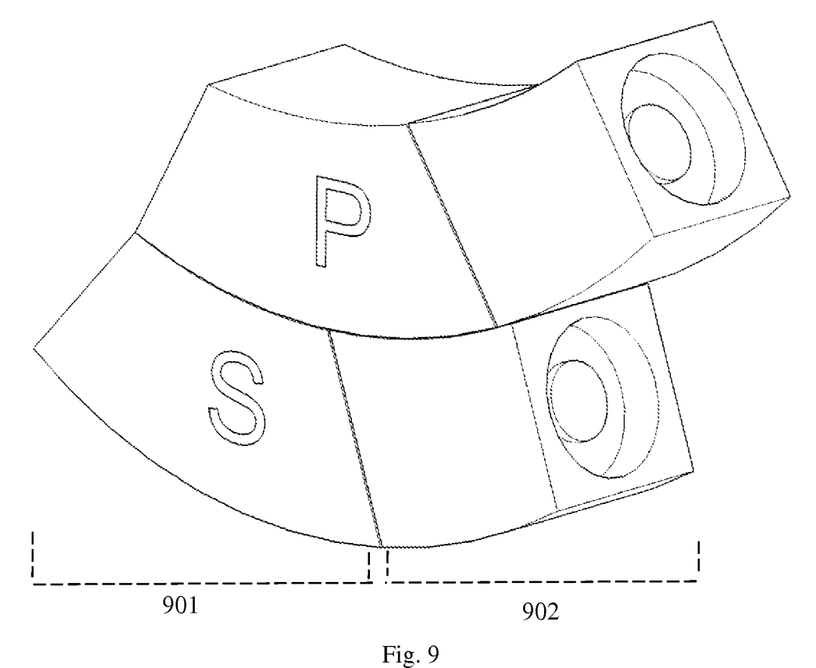
FIG. 9 is a top, front, right side perspective view of a pair of dispensers of the third embodiment of my invention stacked one upon the other.

FIG. 7 illustrates a pair of a third embodiment of my new invention in the exemplary context of a pair of grinders for salt and pepper. In this embodiment, the means of dispensing the spices in the container is a grinding mechanism and an opening in the bottom surface of the dispenser. Like the cruet example, in this embodiment the bottom surfaces 701 and 702 are substantially perpendicular to the curved sides 702, 704, 705, and 706 thereby permitting the dispensers to balance on these bottom surfaces. Other embodiments in the exemplary context of a pair of grinders, not illustrated, have left and right surfaces which are mirror images of each other, as in the first embodiment illustrated in FIGS. 1-3. Additionally, the dispenser of this embodiment is bisected horizontally (when viewing a dispenser in the standing position) into two components, here identified as a top component 707 and a bottom component 708 when the grinder rests in the standing position, or, alternatively, as a left component 901 and a right component 902 when the grinder rests in a lying position as illustrated in FIG. 9. FIG. 8 illustrates the operation of the grinding mechanism by twisting the top component 707 relative to the bottom component 708.

Figure 10:
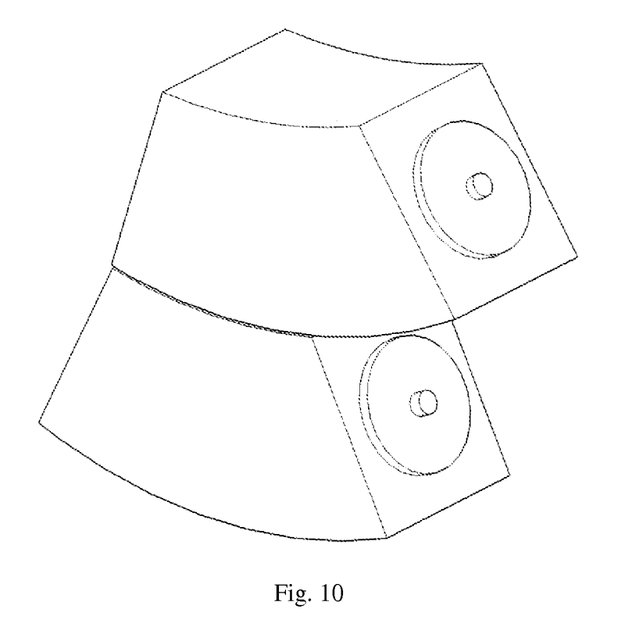
FIG. 10 is a top, front, right side perspective view of a pair of dispensers of a fourth embodiment of my invention in the exemplary context of a pair of cookie or candy jars.

FIG. 10 illustrates a pair of dispensers of a fourth embodiment of my invention in the exemplary context of a pair of cookie or candy jars. In this embodiment the means of storing and dispensing the contents is a pair of openings sufficiently large to permit reaching inside the dispensers to remove one or more items. Optionally, lids may be provided which seal the contents inside the jars.

Figure 11:
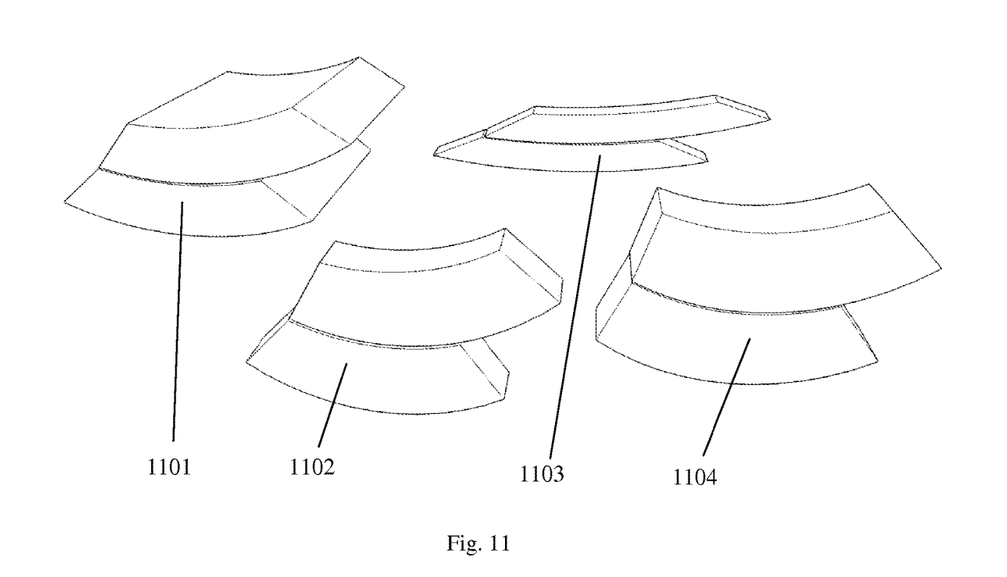
FIG. 11 is an illustration of various possible shapes for the containers of pairs of dispensers of my invention.

FIG. 11 illustrates some of the variations in the size and shape of the containers of dispensers of my invention. These variations in shape and application include, but are not limited to, the following. A pair of substantially flattened containers 1101 is suitable as a set of flasks for dispensing water, soft drinks, wines, or spirits. A pair of narrow containers 1102 is suitable for dispensing inks, paints or dyes. A pair of long thin containers 1103 is suitable for dispensing glues or cosmetics. A pair of containers which are substantially square in cross section 1104 is suitable for dispensing sugar, spices, powders, oils, vinegars, wines or spirits.

Numerous modifications and variations of the present invention are possible in light of the above teachings. It is therefore to be understood that within the scope of the appended claims, the invention may be practiced otherwise than as specifically described herein.

What is claimed is:

1. A pair of dispensers comprising:
   a. a first dispenser comprising:
      i. a container having an arc-like shape, and having a front face, a back face, a top face, a bottom face, a left face, a right face, and at least one cavity;
         1. the front face of said container being a substantially planar arc-shaped surface having a top edge, an opposing bottom edge, a left edge and an opposing right edge;
            a. the top edge of said front face being a concave circular arc of constant radius of curvature;
            b. the opposing bottom edge of said front face being a convex circular arc of constant radius of curvature equal to the radius of curvature of the top edge thereof, being approximately concentric with the top edge thereof, and being substantially longer than the top edge thereof;
            c. the left edge of said front face being a straight line which intersects a tangent to the arc of the top edge thereof, said tangent being determined at the left end point of the top edge of said front face, at an angle greater than 100,° and which intersects a tangent to arc of the bottom edge thereof, said tangent being determined at the left end point of the bottom edge of said front face, at an angle less than 86°; and,
            d. the opposing right edge of said front face being a straight line which intersects a tangent to the arc of the top edge thereof, said tangent being determined at the right end point of the top edge of said front face, at an angle greater than 85,° and intersects a tangent to the arc of the bottom edge thereof, said tangent being determined at the right end point of the bottom edge of said front face, at an angle less than 101°;
         2. the back face of said container being a substantially planar arc-shaped surface having a top edge, an opposing bottom edge, a left edge and an opposing right edge;
            a. the back face of said container being a mirror image of, and substantially parallel to, the front face thereof;
            b. the left edge of the back face of said container being substantially parallel to the opposing right edge of the front face thereof; and,
            c. the opposing right edge of the back face of said container being substantially parallel to the left edge of the front face thereof;
         3. the top face of said container being a cylindrically curved concave surface of constant radius of curvature equal to the radius of curvature of the top edge of the front face thereof, and extending substantially perpendicularly between the top edge of the front face thereof and the top edge of the back face thereof;
         4. the bottom face of said container being a cylindrically curved convex surface of the same constant radius of curvature as the bottom edge of the front face thereof, and extending substantially perpendicularly between the bottom edge of the front face thereof and the bottom edge of the back face thereof;
         5. the left face of said container being a substantially planar surface, being substantially rectangular in shape, and extending substantially perpendicularly between the left edge of the front face thereof and the opposing right edge of the back face thereof;
         6. the right face of said container being a substantially planar surface, being substantially rectangular in shape, and extending substantially perpendicularly between the opposing right edge of the front face thereof and the left edge of the back face thereof; and,
         7. the at least one cavity of said container opening onto at least one face thereof, and being of sufficient size and shape to receive and store a predetermined substance or substances or items;
      ii. a means for dispensing the substance or substances or items contained within the at least one cavity of said container; and,
      iii. optionally, a means for sealing the substance or substances or items stored within the at least one cavity of said container; and,
   b. a second dispenser comprising:
      i. a container having an arc-like shape, and having a front face, a back face, a top face, a bottom face, a left face, a right face, and at least one cavity;
         1. said container being congruent with the container of the first dispenser; and,
         2. the at least one cavity of said container opening onto at least one face thereof, and being of sufficient size and shape to receive and store a predetermined substance or substances or items;
      ii. a means for dispensing the substance or substances or items stored within the at least one cavity of said container; and,
      iii. optionally, a means for sealing the substance or substances or items stored within the at least one cavity of said container;
   whereby, upon positioning the two dispensers such that the whole of the concave top face of the container of the first dispenser is contiguous with the convex bottom face of the container of the second dispenser, and, additionally, the left face of the container of the first dispenser is aligned with and substantially coplanar with the left face of the container of the second dispenser, the pair of dispensers present an optical illusion, namely that the second dispenser appears to be substantially larger than the first dispenser.

2. The dispensers of claim 1, wherein the at least one cavity of each container is the same shape and size, and said at least one cavity opens onto the same at least one face of said containers, and the means of sealing and dispensing the substance, substances or items is the same for each dispenser.

3. The dispensers of claim 1, wherein the means for sealing and dispensing the substance or substances or items stored in at least one of the dispensers is at least one removable cap affording access to the at least one cavity in the at least one face of the container of said dispenser, so that the substance or substances or items can be placed into the dispenser and subsequently dispensed by pouring or shaking them out.

4. The dispensers of claim 1, wherein the means for sealing and dispensing the substance or substances or items stored in at least one of the dispensers is a narrow tube extending from a removable cap, said cap sealing a single cavity in one of the faces of the container of at least one of the dispensers, said narrow tube being suitable for dripping a liquid contained within said cavity.

5. The dispensers of claim 1, wherein the means for dispensing the substance or substances stored in at least one of the dispensers is at least one hand operated pump for dispensing liquids extending from at least one sealed cavity in at least one face of the container of said dispenser.

6. The dispensers of claim 1, wherein the means for dispensing the substance stored in at least one of the dispensers is a cap comprising one or more perforations, said cap sealing a single cavity opening onto one of the six faces of the container of said dispenser, and the one or more perforations in said cap allowing the dispensing of the substance stored in said cavity by inverting and shaking the container.

7. The dispensers of claim 1, wherein the means for dispensing the substance stored in at least one of the dispensers is at least two caps comprising one or more closeable perforations, said caps sealing at least two cavities opening onto at least one face of the container of said dispenser, and wherein the one ore more perforations in said caps allow, when opened, the dispensing of the substance or substances stored in said cavities by inverting and shaking the container.

8. The dispensers of claim 1, wherein the means for dispensing the substance stored in at least one of the dispensers is a grinding mechanism suitable for use with spices or salts, and one of the six faces of the container of said dispenser has one or more apertures to permit the passage of the ground substance.

9. The dispensers of claim 8, wherein an armature exits the face of at least one dispenser opposite to the face of said container or containers with the one or more apertures, and said armature or armatures operate the grinding mechanism.

10. The dispensers of claim 8, wherein at least one container of said dispensers has been bisected along a plane substantially parallel to either the left face or the right face of said container resulting in a left component and a right component, and the grinder mechanism of said dispenser being operated by twisting the left component relative to the right component.

11. The dispensers of claim 1 wherein the right and left faces of the containers of said dispensers are congruent and intersect the top faces of said containers at the same angle and intersect the bottom faces of said containers at the same angle.

12. The dispensers of claim 1 wherein the angle of intersection between the right faces of the containers of said dispensers and the top faces of the containers of said dispensers is sufficiently close to 90° to permit standing the dispensers on their right faces.

13. The dispensers of claim 1 wherein the means for dispensing the substance or substances or items contained in at least one of the dispensers is at least one aperture in at least one surface of the containers of said dispensers, said apertures being sufficiently large to permit reaching inside said dispensers to remove the substance or substances or items contained therein.

14. A set of dispensers comprising dispensers of claim 1 grouped with at least one additional dispenser from a pair of dispensers of claim 1, the containers of all dispensers in the set being congruent.

15. The dispensers of claim 1 wherein at least one of the edges of the containers of said dispensers is substantially rounded.

16. The dispensers of claim 1 wherein at least one of the faces of the containers of said dispensers is undulate, striated, dimpled, or otherwise textured.

17. The dispensers of claim 1 wherein the containers are fabricated with at least one material selected from wood, fabric, leather, metal, glass, natural fibers, ceramics, and polymeric substance.

18. A method of assembling a pair of illusionary dispensers identical in shape and size by creating the illusion that one dispenser is larger than the other of comprising:
 a. providing a first dispenser comprising:
   i. a container having an arc-like shape, and having a front face, a back face, a top face, a bottom face, a left face, a right face, and at least one cavity;
     1. the front face of said container being a substantially planar arc-shaped surface having a top edge, an opposing bottom edge, a left edge and an opposing right edge;
       a. the top edge of said front face being a concave circular arc of constant radius of curvature;
       b. the opposing bottom edge of said front face being a convex circular arc of constant radius of curvature equal to the radius of curvature of the top edge thereof, being approximately concentric with the top edge thereof, and being substantially longer than the top edge thereof;
       c. the left edge of said front face being a straight line which intersects a tangent to the arc of the top edge thereof, said tangent being determined at the left end point of the top edge of said front face, at an angle greater than 100,° and which intersects a tangent to arc of the bottom edge thereof, said tangent being determined at the left end point of the bottom edge of said front face, at an angle less than 86°; and,
       d. the opposing right edge of said front face being a straight line which intersects a tangent to the arc of the top edge thereof, said tangent being determined at the right end point of the top edge of said front face, at an angle greater than 85,° and intersects a tangent to the arc of the bottom edge thereof, said tangent being determined at the right end point of the bottom edge of said front face, at an angle less than 101°;
     2. the back face of said container being a substantially planar arc-shaped surface having a top edge, an opposing bottom edge, a left edge and an opposing right edge;
       a. the back face of said container being a mirror image of, and substantially parallel to, the front face thereof;
       b. the left edge of the back face of said container being substantially parallel to the opposing right edge of the front face thereof; and,
       c. the opposing right edge of the back face of said container being substantially parallel to the left edge of the front face thereof;
     3. the top face of said container being a cylindrically curved concave surface of constant radius of curvature equal to the radius of curvature of the top edge of the front face thereof, and extending substantially perpendicularly between the top edge of the front face thereof and the top edge of the back face thereof;

4. the bottom face of said container being a cylindrically curved convex surface of the same constant radius of curvature as the bottom edge of the front face thereof, and extending substantially perpendicularly between the bottom edge of the front face thereof and the bottom edge of the back face thereof;
5. the left face of said container being a substantially planar surface, being substantially rectangular in shape, and extending substantially perpendicularly between the left edge of the front face thereof and the opposing right edge of the back face thereof;
6. the right face of said container being a substantially planar surface, being substantially rectangular in shape, and extending substantially perpendicularly between the opposing right edge of the front face thereof and the left edge of the back face thereof; and,
7. the at least one cavity of said container opening onto at least one face thereof, and being of sufficient size and shape to receive and store a predetermined substance or substances or items;

ii. a means for dispensing the substance or substances or items contained within the at least one cavity of said container; and, iii. optionally, a means for sealing the substance or substances or items stored within the at least one cavity of said container; and, b. providing a second dispenser comprising:
i. a container having an arc-like shape, and having a front face, a back face, a top face, a bottom face, a left face, a right face, and at least one cavity;
1. said container being congruent with the container of the first dispenser; and,
2. the at least one cavity of said container opening onto at least one face thereof, and being of sufficient size and shape to receive and store a predetermined substance or substances or items;

ii. a means for dispensing the substance or substances or items stored within the at least one cavity of said container; and, iii. optionally, a means for sealing the substance or substances or items stored within the at least one cavity of said container;

whereby, upon positioning the two dispensers such that the whole of the concave top face of the container of the first dispenser is contiguous with the convex bottom face of the container of the second dispenser, and, additionally, the left face of the container of the first dispenser is aligned with and substantially coplanar with the left face of the container of the second dispenser, the pair of dispensers present an optical illusion, namely that the second dispenser appears to be substantially larger than the first dispenser.

* * * * *